United States Patent [19]

Hassick

[11] Patent Number: 5,624,570

[45] Date of Patent: Apr. 29, 1997

[54] METHOD FOR REDUCING TURBIDITY IN LAUNDRY WASTE WATER

[75] Inventor: Denis E. Hassick, Monroeville, Pa.

[73] Assignee: Calgon Corporation, Pittsburgh, Pa.

[21] Appl. No.: 609,707

[22] Filed: Mar. 1, 1996

[51] Int. Cl.$^6$ .................................................. C02F 1/56
[52] U.S. Cl. ......................... 210/728; 210/734; 210/735
[58] Field of Search ............................. 210/734, 735, 210/728

[56] References Cited

U.S. PATENT DOCUMENTS

| | | | |
|---|---|---|---|
| 3,686,151 | 8/1972 | Keim | 210/734 |
| 3,719,748 | 3/1973 | Manfroy et al. | 210/734 |
| 3,968,037 | 7/1976 | Morgan et al. | 210/735 |
| 4,053,512 | 10/1977 | Panzer et al. | 210/735 |
| 4,108,768 | 8/1978 | Sebelik et al. | |
| 4,198,294 | 4/1980 | Deane. | |
| 4,673,511 | 6/1987 | Richardson et al. | 210/735 |
| 5,013,456 | 5/1991 | St. John et al. | 210/735 |
| 5,076,937 | 12/1991 | Montgomery. | |
| 5,209,854 | 5/1993 | Reed et al. | 210/734 |

FOREIGN PATENT DOCUMENTS 2124301  5/1994  Canada.

*Primary Examiner*—Neil McCarthy
*Attorney, Agent, or Firm*—W. C. Mitchell; D. R. Meyers

[57] ABSTRACT

A method for reducing turbidity in laundry waste water comprising the steps of treating said water with effective amounts of a first polymer comprised of dimethyl dialkyl ammonium chloride (DMDAAC) and dialkyl diallyl ammonium monomers (DADAAX) other than DMDAAC having alkyl groups with from 8 to 18 carbon atoms and counterions with an ionization constant greater than $10^{-8}$, and a second cationic, nonionic or anionic acrylamide polymer is disclosed.

12 Claims, No Drawings

METHOD FOR REDUCING TURBIDITY IN LAUNDRY WASTE WATER

BACKGROUND OF THE INVENTION

1. Field of the Invention

The present invention relates to methods for reducing turbidity and/or contamination in laundry waste water by treating the water with an effective amount of a first polymer comprised of dimethyl diallyl ammonium chloride (DMDAAC) and a dialkyl diallyl ammonium monomer (DADAAX) other than DMDAAC, and a second copolymer which is either an anionic, nonionic or cationic acrylamide polymer.

2. Description of the Background Art

The character of waste water generated by an industrial laundry is in large part a function of the customer group that the laundry serves. This customer group typically includes a wide variety of industrial and commercial firms including but not limited to heavy manufacturing industries, the electroplating and automotive industries, battery manufacturers, the service industries, newspapers, printers, auto garages, schools, and commercial and retail businesses. Because of these diverse customers, a wide variety of contaminants are present in the waste water of a typical laundry. Representative of the contaminants are oils and greases, heavy metals such as lead, cadmium or zinc, suspended solids such as dirt, hydrocarbon solvents, organic materials and others. Waste water from industrial laundries further includes in its complex mixture the soaps and surfactants used for cleaning; it also generally has high Biological Oxygen Demand (BOD), high Chemical Oxygen Demand (COD) and an alkaline pH. The range of constituents, as well as the variability that exists in laundry wastes, makes it a unique waste water to treat. Laundry waste water is also unique in that most contaminants enter the waste water not as a result of intrinsic processes or raw materials, but rather as residual materials discharged from the garments, shop towels, and other dust control items used by the laundries' customers.

Discharge of this laundry waste water to a municipal Publicly Owned Treatment Works (POTW) presents a significant problem to commercial laundries that generate large volumes of waste water containing the types of contaminants listed above. A typical industrial laundry has 20,000 to 200,000 gallons per day of discharge water. This can typically represent about 0.2% of the hydraulic load on a municipal treatment plant, yet at the same time represent 15 to 20% of its treatment load. In order to comply with local and federal discharge requirements, it is therefore often necessary to treat laundry waste water prior to discharge of the water to POTW. Typically, such waste is treated by adding effective amounts of chemical coagulation and/or flocculation agents, which causes a major part of the colloidally dispersed solids and oils in the water to be transformed together with the coagulants and/or flocculants into an easily separable form, mostly into a non-slimy flocculant deposit. Dissolved air floatation (DAF) is then typically used to separate the flocculant solids from the water phase. Vacuum filtration, pressure filtration or belt press filtration can be used to further dewater the floated solids.

The response of an individual waste water to a polymeric treatment additive is a complex function of the water's physical and chemical composition including, for example, the chemical composition of dispersed solid phases, the types of oils and greases, the average particle size, the size distribution of all dispersed phases, the washing chemicals and their concentrations, the temperature, the pH, etc. Added to this complexity is the presence of microorganisms that change the character of the system with time.

The terms coagulation and flocculation, as used herein, collectively refer to the separation of suspended solid particles from aqueous systems. This generally occurs by neutralizing the charge of the particles (coagulation), followed by agglomeration of the neutralized solids (flocculation).

Turbidity, as used herein, is defined as the cloudiness or haziness of a solution caused by finely suspended particles. Turbidity is measured using nephelometric turbidity units (NTU). As used herein, low turbidity suspensions are those generally having a low solids concentration (on a weight basis), i.e., a solids weight percent of 0.1 or less. This typically corresponds with an approximate turbidity of 50 NTU's or less, but may vary due to the nature of the solids or dissolved colored matter. High solids suspensions include those systems containing in excess of 0.1 weight percent suspended solids, which generally corresponds to a turbidity of greater than 50 NTU's. The present invention, while useful in water of any turbidity, is particularly directed to waters having a high turbidity.

From an ecological and economic viewpoint, the treatment of laundry waste water represents a problem of constantly increasing importance and numerous methods of treating this waste water are reported. For example, U.S. Pat. No. 5,076,937 describes a method for removing impurities such as the oil and grease associated with a pH activated surfactant from waste water by deactivating the surfactant to cause release of these impurities, infusing a gas into the solution, coalescing the oil and grease droplets with the gas to achieve droplet buoyancy, forming a layer of said droplets atop said solution, removing said layer and adjusting the pH of the solution to about neutral.

U.S. Pat. No. 4,198,294 discloses a method of reclaiming waste water by emulsifying the water with a high molecular weight anionic surface active oil, breaking the emulsion thereby producing a coherent flocculant which occludes the insoluble matter suspended in the water, and separating the flocculant from the purified water.

U.S. Pat. No. 4,108,768 discloses a method of purifying industrial waste waters by adjusting the pH of the water to at least 11.6, adding calcium chloride to flocculate oil or grease in the water, adding a coagulant to agglomerate the flocculant, and removing the flocculant.

Canadian patent 2124301 discloses a demulsifier comprising a hydrophobic polyelectrolyte copolymer comprising DMDAAC and a hydrophobic monomer. The hydrophobic monomer disclosed in this patent is selected from a group consisting of a quaternized dialkylaminoalkyl methacrylates and alkyl esters of (meth)acrylic acids, and not DADAAX as taught by the present invention. Moreover, while the patent is directed to waste water in general it does not specifically delineate efficacy in laundry waste water.

None of these methods for laundry waste water purification suggests the methods of the present invention, however.

Other treatments of laundry waste water include treating the water with a cationic polymer such as poly dimethyl diallyl ammonium chloride (poly DMDAAC), to destabilize the colloidal solids, followed by addition of a high molecular weight anionic or cationic acrylamide copolymer. The inventors have discovered that using a cationic copolymer of DMDAAC and another DADAAX followed by the addition of a high molecular weight anionic or cationic acrylamide copolymer results in an unexpected reduction of turbidity and contamination in the final settled water.

Because of the importance of reducing contamination in laundry waste water prior to discharge, there remains a very real and substantial need for improved methods of treating laundry waste water.

SUMMARY OF THE INVENTION

The present invention generally meets the above need by providing a method for reducing turbidity and/or contamination in laundry waste water comprising the steps of treating said water with an effective amount of: a) a first polymer; and b) a second cationic, nonionic or anionic acrylamide polymer, wherein component a) is prepared using i) dimethyl diallyl ammonium chloride (DMDAAC) and ii) a dialkyl diallyl ammonium monomer (DADAAX) other than DMDAAC and component b) is a high molecular weight cationic, nonionic or anionic acrylamide copolymer.

The polymers used in the methods of the present invention improve separation performance and thereby allow the operator of an industrial laundry increased flexibility in operation. These methods achieve improved discharge limits while using less of the expensive cationic polymers currently in use.

DETAILED DESCRIPTION OF THE INVENTION

The present invention is directed to a method for reducing turbidity in laundry waste water comprising treating said water with an effective amount of: a) a first polymer; and b) a second cationic, nonionic or anionic acrylamide polymer, wherein component a) comprises i) about 90 to about 99.9%, by weight, of dimethyl diallyl ammonium chloride (DMDAAC) and ii) about 0.1 to about 10%, by weight, of one or more members selected from the group consisting of dialkyl diallyl ammonium monomers (DADAAX) other than DMDAAC and wherein the molecular weight of component a) ranges from about 50,000 to about 3,000,000 and the molecular weight of component b) ranges from about 1,000,000 to about 15,000,000 as determined by Gel Permeation Chromatography or intrinsic viscosity methods. Such methods of molecular weight determination will be familiar to those skilled in the art.

More specifically, the DADAAX of component a) is a quaternary dialkyl diallyl ammonium monomer wherein the alkyl group is selected from alkyl groups having from about 8 to 18 carbon atoms and wherein said quaternary dialkyl diallyl ammonium monomer's counterion is selected from the group consisting of conjugate bases of acids having an ionization constant greater than $10^{-8}$. Preferably, the alkyl group contains primarily 12 carbon atoms, and the counterion is selected from the group consisting of fluoride, bromide, chloride, hydroxide, nitrate, acetate, hydrogen sulfate, dihydrogen phosphates and methosulfate. More preferably, the counterion is chloride. The monomer is represented by the structure:

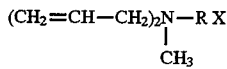

$$(CH_2=CH-CH_2)_2N-R\ X$$
$$\vert$$
$$CH_3$$

where R is $C_8H_{17}$ to $C_{18}H_{37}$ and X is the monovalent conjugate base of an acid with an ionization constant of $>10^{-8}$.

The diallyl dialkyl ammonium monomers (DADAAX) used in this invention are conveniently prepared by the reaction of two moles of allyl chloride with one mole of an alkyl amine followed by reaction with, for example, methyl chloride or dimethyl sulfate to form the quaternary salt. The long chain alkyl amines of the DADAAX moiety are usually derived from natural sources. Accordingly, the alkyl groups may not all contain the same number of carbon atoms, but rather may contain a mixture of similar chain length compounds. Typically, however, one chain length will be predominant in the mixture. Depending on the degree of purification, the alkyl amine will contain a distribution of carbon chain lengths reflecting the distribution of the fatty acid from which it is derived. The DADAAX monomer prepared from the commercial fatty amines, therefore, will not be a pure compound, but will reflect the same distribution of fatty alkyl chain lengths as the original fatty amine starting material. This concept is further explained in the Encyclopedia of Chemical Technology, $4^{th}$ Ed., Vol.2, p 405–425.

The quaternary DMDAAC monomer of component a) comprises from about 90 to about 99.9%, based on total copolymer weight, while the other DADAAX monomer of component a) comprises from about .1 to about 10%, based on total copolymer weight. More preferably, the DMDAAC:DADAAX weight ratio is from about 99.9:.1 to about 95:5, based on the total weight of the polymer. Thus, in the component a) copolymers of the present invention, the DMDAAC moiety of the copolymer is predominant. Additionally, other moieties may be present in the polymer.

As will be appreciated by one skilled in the art, the first cationic copolymer used in the present invention, component a), is a hydrophobic copolymer. Because it is hydrophobic, it is believed to work by combining with the solids contained in the laundry waste water, though the inventors do no intend to be bound by any mechanism.

An especially suitable polymer is that in which the DADAAX portion has 12 carbon atoms and the counterion is chloride. Preferably, the DMDAAC:DADAAC (where C=chloride) weight ratio ranges from about 99.9:0.1 to about 90:10, most preferably from about 99.9:.1 to 95:5, based on total copolymer weight.

The component a) copolymers used in the methods of the present invention may have any molecular weight ranging from about 5,000 to about 3,000,000 with the preferred molecular weight ranging from about 10,000 to 1,000,000. These polymers may be prepared using conventional free radical polymerization techniques familiar to those skilled in the art.

Component a) as described above functions to coagulate any suspended solids and emulsified oils which may be present in the laundry waste water. It is further believed that this coagulation takes place through charge neutralization of the solids though the inventors do not intend to be bound by any mechanism. It is well known in the art to use one or more flocculants to treat coagulated solids to provide better solids removal. Treatment of the laundry waste water with component a) is therefore followed by treatment with component b), which serves to agglomerate the coagulated solids. A variety of conventional polymeric flocculants can be employed depending on the laundry waste water being treated. It is preferred that the flocculant used in the methods of the present invention, referred to as component b) above, be an anionic, nonionic or cationic high molecular weight acrylamide polymer. The molecular weight range of component b) is typically between about 1,000,000 and 15,000, 000, more preferably between about 2,000,000 and 10,000, 000. Such products are commercially available from Calgon Corporation, Nalco, and Cytec. Preferred anionic acrylamides are prepared using (meth)acrylic acid and acrylamide. Hydrolyzed polyacrylamides can also be used. Generally, the carboxylic content of the anionic polymers varies from about 10 to 50%, by weight. Preferred cationic polymers are prepared by the polymerization of conventional cationic monomers with acrylamide. The cationic moieties generally comprise up to about 60–70%, based on total polymer weight of such polymers.

After addition of component b), the agglomeration which forms is removed by dissolved air flotation or other means typically used in the art. Coagulation, flocculation and removal of the solids in the laundry waste water results in a reduction in the turbidity and contamination of the water being treated.

As stated above, an effective amount of each component must be added to the laundry waste water being treated. As used herein, the term "effective amount" refers to that amount of each component necessary to achieve the desired reduction in turbidity and/or contamination in the waste water being treated. An effective amount of component a) will typically range from about 1 to about 1,000 parts per million (ppm) based upon the weight of the water being treated, with 10 to 500 ppm being the preferred treatment range. The exact amount of component a) added will depend on how contaminated the water is; the dirtier the water the more of the polymer required to coagulate the solids. An effective amount of component b) will range from about 1 to about 1000 ppm, preferably about 10 to about 300 ppm, based upon the weight of the water being treated. Again, the amount of component b) used will depend on how much solid is in the water. The effective amount of component b) will typically increase or decrease with the amount of component a) needed. The amount of both components also depends on the level of reduction of turbidity which is desired. These determinations are well within the ordinary skill of one practicing in the art.

As an example of a best mode embodiment of the present invention, component a), the copolymer coagulant, will preferably be a solution polymer in viscous liquid form. Such solution polymers typically are diluted to about 10% or less upon addition to the laundry waste water being treated, although higher dilutions are within the scope of the invention. An effective amount of the final polymer solution is added. Other products can also be used. The product form selected is a matter of choice depending upon storage and handling considerations and is not believed to effect the performance of the polymer. Addition of component a) to the waste water is preferably at a rapid mix zone, just after equalization. Thorough mixing of component a) with the waste water is believed to be important to ensure adequate reaction between component a) and the waste.

Component b), the acrylamide based flocculant, is preferably supplied as an emulsion product, although dry products can also be used in the methods of the present invention. The emulsion will typically be used at a working concentration of about 0.5 to about 2.0% active and added at the influent to the DAF unit. As will be appreciated by one skilled in the art, too much agitation or shear may cause the flocculants to break apart thereby making separation more difficult. The optimal addition points for components a) and b) are based on the design of the individual laundry, and is within the skill of one practicing in the art to determine.

EXAMPLES

The following examples are provided to illustrate the invention in greater detail and should not be construed as limiting the invention in any way.

In Examples I–IV, jar tests were run on water samples taken from industrial laundries located in Ohio, Massachusetts and Pennsylvania, as indicated below. The jar tests, which will be familiar to one skilled in the art, were run according to H. E. Hudson and E. G. Wagner, *Conduct and Use of Jar Tests*, JAWWA, Vol. 73, No. 4., p. 218 (1981), with the following particulars:

2 minutes at the maximum RPM following addition of the first cationic polymer 3 minutes at 70 RPM following addition of the second anionic polymer 5 minutes at 0 RPM.

After the 5 minute settling period, 20 ml samples of supernatant were drawn and turbidity was measured using a Spectronic 21 DUV set at 450 microns and using deionized water as the 100% blank.

The following polymer compositions were used in the examples:

PDMDAAC—Commercially available poly dimethyl diallyl ammonium chloride compounds of varying molecular weight (MW).

81A—A copolymer of dimethyl diallyl ammonium chloride and methyl octyl diallyl ammonium bromide prepared with a monomer molar feed ratio of 95/5. The copolymer had a reduced viscosity of 0.57 dl/gm. The molecular weight of 81A is about 10,700.

82B—A copolymer of dimethyl diallyl ammonium chloride and methyl dodecyl diallyl ammonium bromide prepared with a monomer molar feed ratio of 97.5/2.5. The copolymer had a reduced viscosity of 0.81 dl/gm. The molecular weight of 82B is about 15,300.

83A—A copolymer of dimethyl diallyl ammonium chloride and methyl octadecyl diallyl ammonium bromide prepared with a monomer molar feed ratio of 97.5/2.5. The copolymer had a reduced viscosity of 0.68 dl/gm. The molecular weight of 83A is about 12,800.

44A—A copolymer of dimethyl diallyl ammonium chloride and methyl dodecyl diallyl ammonium chloride prepared with a monomer molar feed ratio of 98.7/1.3. The molecular weight of 44A is about 14,500.

A commercially available anionic polyacrylamide having a molecular weight of about 2–10 million.

EXAMPLE 1

Three waste water samples were evaluated using the identified polymer compositions. The Ohio #1 sample was treated with 150 ppm ferric chloride, 150 ppm lime, 100 ppm cationic polymer and 16 ppm of anionic polyacrylamide. The Ohio #2 sample was treated with 20 ppm cationic polymer and 10 ppm anionic polyacrylamide. The Massachusetts sample was treated with 80 ppm cationic polymer and 12 ppm anionic polyacrylamide. The polyacrylamide used in the Example contained about 30% acrylic acid, by weight, and 70% acrylamide, by weight. The molecular weight of the PDMDAAC was 94000. Percent transmittance was then determined; results are presented in Table 1.

TABLE 1

| | % Transmittance | | |
|---|---|---|---|
| Sample Name | Ohio #1 | Ohio #2 | Mass. |
| PDMDAAC | 42.1 | 24.6 | 25.2 |
| 81A | 64.9 | 23.1 | — |
| 82B | 49.9 | 52 | — |
| 83A | 62.2 | 42.1 | — |
| 44A | 69.8 | 41.7 | 44.7 |

As can be seen, the % transmittance of all the copolymers was better than that of the PDMDAAC alone, except the 81A product at the Ohio #2 location which gave comparable results. A higher % transmittance indicates that more solid was removed from the waste water.

EXAMPLE II

Example II was run with waste water samples from a Pennsylvania laundry facility. The amount of cationic polymer added to each sample is indicated in Table 2 below; 30 ppm of anionic polyacrylamide, containing about 40% acrylic acid, by weight, and about 60% acrylamide by weight, was added to each sample. The molecular weight of the PDMDAAC was 94000.

TABLE 2

| | % Transmittance | | |
|---|---|---|---|
| Sample | 100 ppm | 120 ppm | 140 ppm |
| PDMDAAC | 1.1 | 35.6 | 77.1 |
| 81A | 12.6 | 28.1 | 36.9 |
| 44A | 21.6 | 59.9 | 85.6 |

81A was only more effective than the conventional treatment (PDMDAAC) at the lowest dosage. 44A, however, was superior at all dosages.

EXAMPLE III

Example III was run with waste water from the Ohio #2 location. All of the samples were adjusted to a pH of 7.0 with sulfuric acid and treated with 200 ppm of ferric chloride followed by the cationic polymer and 15 ppm of a 30% acrylic acid/70% acrylamide copolymer. PDMDAAC'S of varying molecular weight were also tested, as indicated in the table.

TABLE 3

| | % Transmittance | |
|---|---|---|
| Sample | 40 ppm | 60 ppm |
| PDMDAAC - 35000 MW | 24.2 | 41.8 |
| PDMDAAC - 94000 MW | 25 | 40.2 |
| PDMDAAC - 99000 MW | 24.4 | 41.8 |
| PDMDAAC - 840000 MW | 24.1 | 32.3 |
| 81A | 9.7 | 23.9 |
| 44A | 40.2 | 54 |
| 82B | 20.5 | 47.5 |
| 83A | 21.8 | 53 |

This example suggests for this water sample the 44A, 82B and 83A products perform best when added at an amount greater than 40 ppm.

EXAMPLE IV

In the following example, the cationic polymer was added first in the amount indicated in Table 4. Anionic polyacrylamide was added incrementally, in the amounts indicated in Table 4, to achieve the optimum result for each cationic dose; the polyacrylamide contained about 40% acrylic acid, by weight, and about 60% acrylamide, by weight. Waste water samples from the Pennsylvania location were used.

TABLE 4

| | % Transmittance/Anionic Polymer Dosage (ppm) Cationic Polymer Dosage | | | | | |
|---|---|---|---|---|---|---|
| Sample | 100 ppm | 150 ppm | 175 ppm | 200 ppm | 225 ppm | 250 ppm |
| PDMDAAC 35000 MW | 0.5/30 | 8.8/30 | 15.1/30 | 43.7/30 | 65.5/25 | 74.4/25 |
| PDMDAAC 94000 MW | 1.3/20 | 18.1/20 | 20.2/20 | 50/20 | 68.9/15 | 76.1/15 |
| PDMDAAC 99000 MW | 1.4/25 | 11.2/25 | 29.2/25 | 58.2/25 | 67.9/20 | 72.8/20 |
| PDMDAAC 840000 MW | 2.1/25 | 20.1/25 | 27.6/25 | 59.3/20 | 70.9/20 | 66.2/20 |
| 44A | 45.3/20 | 67.3/20 | 78.1/20 | 78.8/20 | 83.8/15 | 78.4/15 |

The hydrophobically modified copolymer (44A) demonstrated improved performance across the dosage range compared to the conventional treatment (PDMDAAC).

What is claimed is:

1. A method for reducing turbidity in laundry waste water comprising treating said water with an effective amount of:
   a) a first polymer; and
   b) a second cationic, nonionic or anionic acrylamide polymer, wherein component a) comprises i) about 90 to about 99.9%, by weight, of dimethyl diallyl ammonium chloride (DMDAAC) and ii) about 0.1 to about 10%, by weight, of one or more members selected from the group consisting of dialkyl diallyl ammonium monomers (DADAAX) other than DMDAAC, and wherein the molecular weight of component a) ranges from about 5,000 to about 3,000,000 and the molecular weight of component b) ranges from about 1,000,000 to about 15,000,000 as determined by Gel Permeation Chromatography or intrinsic viscosity methods.

2. The method of claim 1 wherein the member selected from the group consisting of dialkyl diallyl ammonium monomers have the following structure:

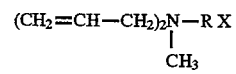

wherein R is $C_8H_{17}$ to $C_{18}H_{37}$ and X is the monovalent conjugate base of an acid with an ionization constant of $>10^{-8}$.

3. The method of claim 2 wherein X is selected from the group consisting of fluoride, bromide, chloride, hydroxide, nitrate, acetate, hydrogen sulfate, dihydrogen phosphates and methosulfate.

4. The method of claim 2 wherein R is $C_{12}H_{25}$ and X is chloride.

5. The method of claim 1 wherein the ratio in component a) of DMDAAC to DADAAX is about 95–99.9% to about 0.1–5%, based on total copolymer weight.

6. The method of claim 1 wherein component b) is a high molecular weight acrylamide copolymer.

7. The method of claim 6 wherein the molecular weight of component b) is between about 2,000,000 and 10,000,000.

8. The method of claim 1 wherein said effective amount of component a) is from 1 to 1,000 ppm based upon the weight of the water being treated.

9. The method of claim 1 wherein said effective amount of component a) is from about 10 to about 500 ppm based upon the weight of the water being treated.

10. The method of claim 1 wherein said effective amount of component b) is from about 1 to about 1000 ppm based upon the weight of the water being treated.

11. The method of claim 1 wherein said effective amount of component b) is from about 10 to about 300 ppm based upon the weight of the water being treated.

12. The method of claim 1 wherein the molecular weight of component a) is between about 10,000 and 1,000,000.

* * * * *